United States Patent [19]

Possis

[11] 3,725,708
[45] Apr. 3, 1973

[54] CORE FOR A DYNAMO-ELECTRIC MACHINE

[75] Inventor: Zinon C. Possis, Minneapolis, Minn.

[73] Assignee: Possis Corporation, Minneapolis, Minn.

[22] Filed: Oct. 7, 1971

[21] Appl. No.: 187,398

[52] U.S. Cl..................310/179, 310/43, 310/259, 310/DIG. 6
[51] Int. Cl..............................................H02k 3/00
[58] Field of Search......310/235, 254, 258, 259, 260, 310/49, 179, 268, 43, DIG. 6; 336/120

[56] References Cited

UNITED STATES PATENTS 2,885,645  5/1959  Wennerberg.....................336/120
3,096,455  7/1963  Hahn................................310/268
3,093,762  6/1963  Henry-Baudot....................310/49

Primary Examiner—R. Skudy
Attorney—Ira Milton Jones

[57] ABSTRACT

Stators and armatures for dynamo electric machines in which the customary windings are replaced by extruded inserts seated in circumferentially spaced holes that extend axially through the core of the stator or armature, each of which inserts consists of a group of parallel spaced apart wires embedded in insulating material, the ends of the wires being connected to conductivity paths of printed circuit boards at the axially opposite faces of the core.

4 Claims, 4 Drawing Figures

PATENTED APR 3 1973 3,725,708

Zinon C. Possis
INVENTOR.

BY Ira Milton Jones
ATTORNEY

CORE FOR A DYNAMO-ELECTRIC MACHINE

This invention relates to the production of stators and armatures for motors, generators, alternators and the like, all of which can be classified as dynamo electric machines.

Conventionally, stators and armatures are made by winding wire into circumferentially spaced slots in the core, by winding wire around salient poles on the core or by applying prewound coils of wire onto poles formed on the core. Although highly sophisticated winding machines have been developed to automatically wind the wire coils onto stator and armature cores at high production rates, the manufacture of stators and armatures by any of the conventional methods is still relatively expensive. In addition, the percentage of rejects because of damage to the wire as it enters the slots in the core or is wound around poles thereon, is high, in some instances as much as twenty percent.

Not only does the conventional method of making stators and armatures entail the provision of expensive coil winding machines, it requires wedge and cell inserting machines with which the cores were prepared for the reception of the wire coils wound thereon by the coil winding machines, and in addition it necessitates coating and impregnating the wound stators and armatures with a thermo-plastic insulation, usually an epoxy resin.

Also, the need for wire receiving slots opening to the peripheral surface of armature cores and to the inner cylindrical surface of stator cores objectionably affects the electrical efficiency of stators and armatures produced in the conventional manner.

The present invention eliminates the need for the various expensive machines and attendant labor needed in the production of stators and armatures by the conventional procedure and obviates the need for coating or impregnating any part thereof, and in addition improves the electrical efficiency of stators and armatures.

It is thus the purpose and object of this invention to provide an improved stator and/or armature for dynamo electric machines, and to provide a method of making the improved stator and/or armature which (1) is far less costly than the conventional methods heretofore employed, (2) practically eliminates rejects, (3) effects a substantial saving in copper, and (4) greatly minimizes the chance of human error in the production of the improved product.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

THe accompanying drawings illustrate one complete example of the physical embodiment of the invention constructed according to the best mode so far devised for the practical application of the principles thereof, and in which.

Figure 1:
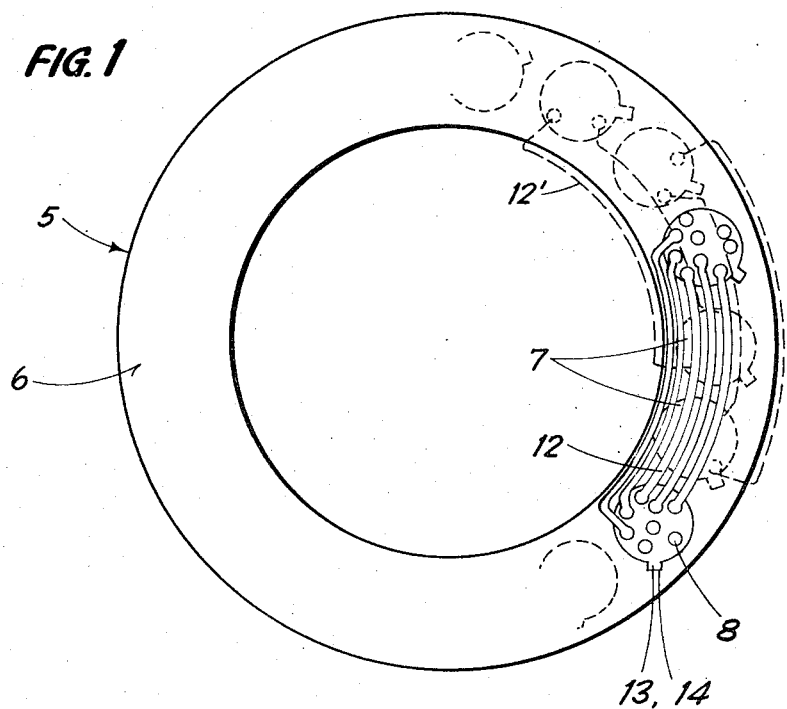
FIG. 1 is an end view of a stator made in accordance with the invention.
Figure 2:
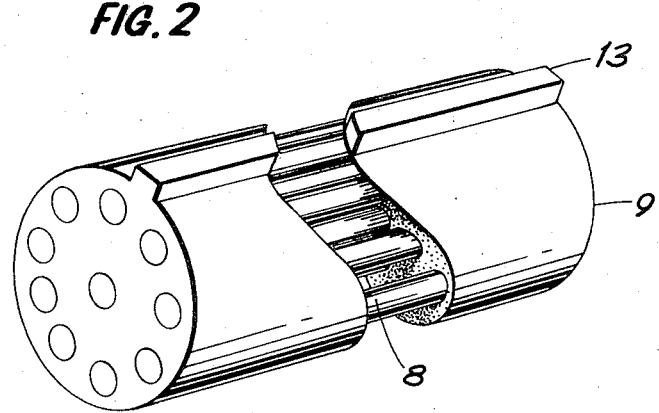
FIG. 2 is a perspective view of one of the components of the improved stator.

Referring to the drawings, the numeral 5 designates generally a finished stator made by the method of this invention. This stator comprises an annular core 6 of ferromagnetic material, preferably a stack of soft steel laminations secured together in any conventional way, and a plurality of excitation "windings" 7 arranged to form circumferentially spaced electro-magnetic poles. To this extent the stator 5 is the same as any conventional stator. The difference resides in the nature of the excitation windings and in the way they are formed.

The "windings" 7 consist of groups of straight lengths of wire 8 embedded in rod-like bodies 9 of insulating material that are press-fitted into circumferentially spaced holes 10 that extend axially through the core 6, and printed circuit boards 11 at the axially opposite faces of the core. The conductivity paths 12 of the printed circuit boards are electrically and mechanically fused to the opposite ends of the embedded wires 8 to so connect the various groups of wires that they produce the desired electro-magnetic poles. This grouping of the wires is depicted in part in FIGS. 1 and 3 by the dotted lines 12'. Suitable leads (not shown) are connected with certain of the conductivity paths of the printed circuit boards to enable the stator to be connected into the appropriate circuits of the dynamo electric machine of which the stator becomes a part.

The rod-like bodies 9 with the wires 8 embedded therein, are preferably cut from a rod which is considerably longer than the individual bodies, and which is produced by the extrusion process. Accordingly, the insulating material of which the bodies are formed, and which may be a polyester resin, is forced through an extrusion die along with a group of wires suitably spaced apart as they enter the die along with the polyester resin.

This extrusion technique is well known, and since it forms no part of this invention, no attempt has been made to illustrate it.

In cross section the extruded rod, and hence the bodies 9, is cylindrical except for the presence of longitudinally extending key 13. This key fits a keyway 14 that opens to each of the holes 10. The key and keyway serve to hold each body or insert 9 in a predetermined orientation to assure correct alignment of its embedded wires 8 with the conductivity path terminals of the printed circuit boards to which the wires are to be connected. Obviously, of course, any other suitable means of holding the bodies against rotation may be substituted for the key and keyways, but no matter which approach is employed the bodies 9 should have a snug press-fit in the holes 10. Any simple arbor press can be employed to insert the bodies into the holes.

Figure 3:
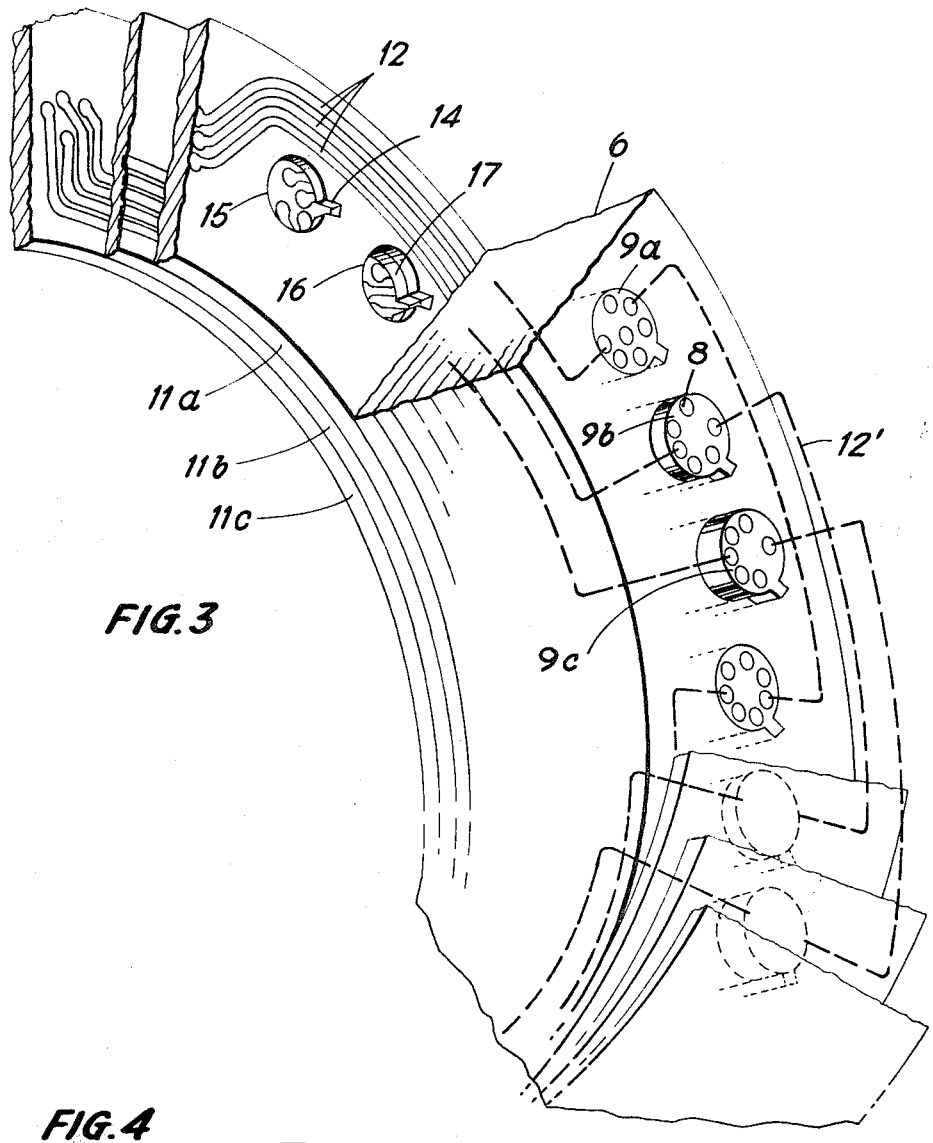
FIG. 3 is a fragmentary perspective view of the improved stator.

Needless to say the conductivity paths 12 of the printed circuit boards connecting the different groups of embedded wires must be insulated from one another. One way of meeting this requirement is to provide axially spaced apart or "stacked" conductivity paths. This may be done by employing a number of printed circuit boards at each face of the core and having the extruded bodies with their embedded wires of different lengths so that some of the extruded bodies 9A have their ends flush with the axially opposite faces of the core, as seen in FIG. 3, while others, designated 9B have their ends spaced from the faces of the core a distance equal to the thickness of one printed circuit board, and the remainder, designated 9C have their ends spaced from the faces of the core by an amount equal to twice the thickness of the printed circuit board. This arrangement places the exposed ends of the embedded wires on three different levels and enables the conductivity paths of three separate printed circuit boards at each core face to be stacked.

The innermost printed circuit board, designated 11A in FIG. 3, lies flat against the face of the core and its conductivity paths have their terminals connected to the ends of embedded wires of the bodies 9A. This innermost board 11A has holes 15 and 16 located to accommodate the projecting ends of the inserts or bodies 9B and 9C. The intermediate printed circuit board 11B has the terminals of its conductivity paths located to connect with the ends of embedded wires of the bodies or inserts 9B; and has holes 17 to accommodate the projecting ends of the longest bodies or inserts 9C. Since the outermost printed circuit board 11C has no inserts projecting through it, it has no holes and the terminals of its conductivity paths are located to make contact with the ends of embedded wires in the bodies or inserts 9C.

As noted hereinbefore, all of the junctions between terminals of conductivity paths on the printed circuit boards with ends of embedded wires of the extruded inserts are electrically and mechanically fused in any suitable manner as by ultrasonic fusion means.

Figure 4:
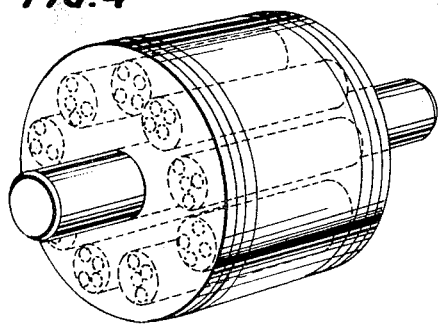
FIG. 4 is a perspective view of an armature made in accordance with this invention.

Although the invention has been described from the standpoint of its applicability to stators, it should be apparent that all that has been said applies equally well to armatures, and in FIG. 4, an armature made in accordance with this invention is illustrated. The reference numerals which appear on this figure correlate its various elements with the corresponding parts in the stator.

Attention is directed to the fact that in both the stator and the armature of this invention there are no open slots or other interruptions in the cylindrical boundary surfaces as there are in conventional stators and armatures. Hence, the stators and armatures of this invention possess greater electrical efficiency than those produced by conventional methods. Also, since no part of the "windings" is exposed, there is no need for coating or impregnating the stator or armature with epoxy resin or other insulating material.

The junctions between the terminals of the conductivity paths of the printed circuit boards with their respective conductor wires of the extruded inserts tie the assembly together, but if greater security against disassembly is desired, tie bars (not shown) can be extended through the printed circuit boards and the core to securely hold the same together.

Those skilled in the art will appreciate that the invention can be embodied in forms other than as herein disclosed for purposes of illustration.

The invention is defined by the following claims:

1. In a dynamo electric machine having a core with axially opposite faces, the core being formed of ferromagnetic material and having conductors thereon arranged to form circumferentially spaced electro-magnetic poles, certain of said conductors extending axially through the core, the improvement which resides in said conductors that extend axially through the core being arranged in groups each of which consists of a plurality of parallel spaced apart wires, all of which are embedded in a rod-like body of insulating material with all surfaces of the wires except the ends thereof covered by the material of said body and all spaced between the wires completely filled by the material of said body to electrically insulate the wires from one another, said bodies being snugly seated in circumferentially spaced holes that extend axially through he core with the ends of the bodies flush with the axially opposite faces of the core and the ends of the wires exposed.

2. In a dynamo electric machine, the improvement set forth in claim 1, further characterized in that others of said conductors are conductivity paths of printed circuit boards at the axially opposite faces of the core.

3. In a dynamo electric machine, the improvement set forth in claim 2, further characterized in that the exposed ends of said embedded wires are flush with the ends of the bodies of insulating material in which they are embedded and electrically connected to the terminals of conductivity paths of the printed circuit boards.

4. In a dynamo electric machine, the improvement set forth in claim 3 further characterized by means for securing each of said bodies against rotation in the hole in which it is seated to assure a predetermined orientation of its group of wires with respect to the terminals of the conductivity paths of the printed circuit boards connected thereto.

* * * * *